(12) United States Patent
Wang

(10) Patent No.: US 11,819,009 B1
(45) Date of Patent: Nov. 21, 2023

(54) AUTOMATIC EGG TURNER FOR INCUBATOR

(71) Applicant: Daoli Wang, Wuxi (CN)

(72) Inventor: Daoli Wang, Wuxi (CN)

( * ) Notice: Subject to any disclaimer, the term of this patent is extended or adjusted under 35 U.S.C. 154(b) by 0 days.

(21) Appl. No.: 18/082,602

(22) Filed: Dec. 16, 2022

(51) Int. Cl.
*A01K 41/06* (2006.01)

(52) U.S. Cl.
CPC .................................. *A01K 41/06* (2013.01)

(58) Field of Classification Search
CPC ....................................................... A01G 41/06
See application file for complete search history.

(56) References Cited

U.S. PATENT DOCUMENTS

| | | | | |
|---|---|---|---|---|
| 1,264,664 A | * | 4/1918 | Light | A01K 41/06 119/327 |
| 1,270,931 A | * | 7/1918 | Dudley et al. | A01K 41/06 119/327 |
| 1,444,783 A | * | 2/1923 | Elliott | A01K 41/06 119/323 |
| 1,473,792 A | * | 11/1923 | Matheus | A01K 41/06 119/323 |
| 1,560,746 A | * | 11/1925 | Walter | A01K 41/06 119/323 |
| 1,579,350 A | * | 4/1926 | Davis | A01K 41/06 119/325 |
| 1,608,408 A | * | 11/1926 | Mackenzie | A01K 41/06 119/323 |
| 1,608,776 A | * | 11/1926 | Davis | A01K 41/06 99/644 |
| 1,616,972 A | * | 2/1927 | Hilton | A01K 41/06 119/327 |
| 1,617,920 A | * | 2/1927 | Miller | A01K 41/06 119/323 |
| 1,738,685 A | * | 12/1929 | Bohmker | A01K 41/06 119/323 |
| 2,404,228 A | * | 7/1946 | Hamlin | A01K 41/06 74/110 |
| 2,486,030 A | * | 10/1949 | James | A01K 41/06 414/781 |
| 2,625,906 A | * | 1/1953 | Forney | A01K 41/06 68/152 |
| 3,669,075 A | * | 6/1972 | Marsh | A01K 41/06 119/323 |
| 3,783,833 A | * | 1/1974 | Bailey | A01K 41/06 119/319 |
| 2002/0150460 A1 | * | 10/2002 | Chalker, II | A01K 45/007 414/781 |
| 2019/0335717 A1 | * | 11/2019 | Zhao | A01K 41/06 |

FOREIGN PATENT DOCUMENTS

| | | | | | |
|---|---|---|---|---|---|
| GB | | 2093328 A | * | 9/1982 | ............ A01K 41/06 |
| WO | WO-8803362 A1 | * | 5/1988 | ............ A01K 41/06 |

\* cited by examiner

*Primary Examiner* — Monica L Perry
*Assistant Examiner* — Aaron M Rodziwicz

(57) ABSTRACT

An automatic egg turner for an incubator includes an egg turning assembly mounted on an incubator base, the egg turning assembly includes an egg troughs, a connecting plate and an egg turning motor, the egg troughs is configured for holding several eggs and being respectively overlapped with the incubator base and the connecting plate, the connecting plate is movably connected into the incubator base, and the egg turning motor is mounted on a bottom of the incubator base and is configured for driving the connecting plate to slide left and right in the incubator base so as to drive the egg troughs to swing left and right in the incubator base.

9 Claims, 6 Drawing Sheets

AUTOMATIC EGG TURNER FOR INCUBATOR

TECHNICAL FIELD

The present disclosure relates to the technical field of automatic egg turning, in particular to an automatic egg turner for an incubator.

BACKGROUND ART

Eggs need to be turned during incubation, which ensures that the eggs are uniformly heated, and meanwhile, egg embryos are prevented from being adhered to eggshells. If the eggs are not turned, the incubating rate of the eggs may be very low. An automatic egg turner belongs to an accessory of an egg incubator and is used to automatically rotate positions of the eggs during egg incubation, so that the eggs can be uniformly heated, and troubles caused by artificially turning the eggs is avoided. In the prior art, a traditional egg turner in the current market is shown as the following view and works in a mode that the eggs are enabled to be inclined left and right as well as back and forth. However, a traditional egg turner has a structure that a motor is exposed, heat may be generated when the motor works, and thus, the eggs on the side close to the motor are difficult to incubate due to overhigh heat (there are very high requirements on temperatures during egg incubation). Furthermore, the egg turner takes up too much space in the incubator due to large volume, which indirectly causes the large volume of the incubator using such an egg turner, so that the material and transportation costs are both increased.

Therefore, how to provide an automatic egg turner for an incubator to prevent the heat generated by the motor from affecting the incubating rate of the eggs and reducing the production cost becomes a technical problem to be urgently solved.

SUMMARY OF THE INVENTION

The technical problem to be solved by the present disclosure is to provide an automatic egg turner for an incubator to prevent heat generated by a motor from affecting the incubating rate of eggs and reducing the production cost.

For this purpose, according to a first aspect, an embodiment of the present disclosure discloses an automatic egg turner for an incubator, including an egg turning assembly mounted on an incubator base, the egg turning assembly including egg troughs, a connecting plate and an egg turning motor, the egg troughs being used for holding several eggs and being respectively overlapped with the incubator base and the connecting plate, the connecting plate being movably connected into the incubator base, and the egg turning motor being mounted on the bottom of the incubator base and being used for driving the connecting plate to slide left and right in the incubator base so as to drive the egg troughs to swing left and right in the incubator base.

The present disclosure is further set to be that a driving gear is mounted on an output shaft of the egg turning motor, the bottom of the connecting plate is connected with a driven gear engaged with the driving gear, and the incubator base is provided with a through hole facilitating moving the driven gear.

The present disclosure is further set to be that one end of the connecting plate is provided with an insert block, and the driven gear is provided with a slot in inserting fit with the insert block.

The present disclosure is further set to be that the incubator base is internally provided with a cover plate which is detachably connected, and the cover plate is used for limiting the motion stroke of the driven gear.

The present disclosure is further set to be that the driving gear is a circular gear, and the driven gear is a straight gear.

The present disclosure is further set to be that the egg turning motor is fixedly mounted on the bottom of the incubator base via a motor fixing plate.

The present disclosure is further set to be that the incubator base is provided with a motor cover for covering the egg turning motor, and the motor cover is detachably connected to the incubator base.

The present disclosure is further set to be that the bottom of the incubator base is provided with a mounting groove facilitating mounting the egg turning motor, and the section of the mounting groove is disposed to be arc-shaped.

The present disclosure is further set to be that two ends of each of the egg troughs are both provided with first overlapping shafts, and the incubator base is internally provided with first overlapping grooves in overlapping fit with the first overlapping shafts.

The present disclosure is further set to be that the connecting plate is provided with at least one second overlapping groove, and the egg troughs are provided with second overlapping shafts in overlapping fit with the second overlapping grooves.

The present disclosure has the following beneficial effects: the egg turning motor drives the connecting plate to slide left and right in the incubator base so as to drive the egg troughs to swing left and right in the incubator base, and thus, the automatic egg turner for the incubator is provided. As the egg turning motor is mounted on the bottom of the incubator base, the egg turning assembly takes up small space in the incubator base, heat generated by the motor can be prevented from affecting the incubating rate of the eggs, an egg turner mechanism is simplified, and the production cost is reduced.

BRIEF DESCRIPTION OF THE DRAWINGS

To describe the technical solutions in the embodiments of the present disclosure or the prior art more clearly, the accompanying drawings required for describing the specific embodiments or the prior art will be briefly introduced below. Apparently, the accompanying drawings in the following description show only some embodiments of the present disclosure, and a person of ordinary skill in the art may still derive other accompanying drawings from these accompanying drawings without creative efforts.

Figure 1:
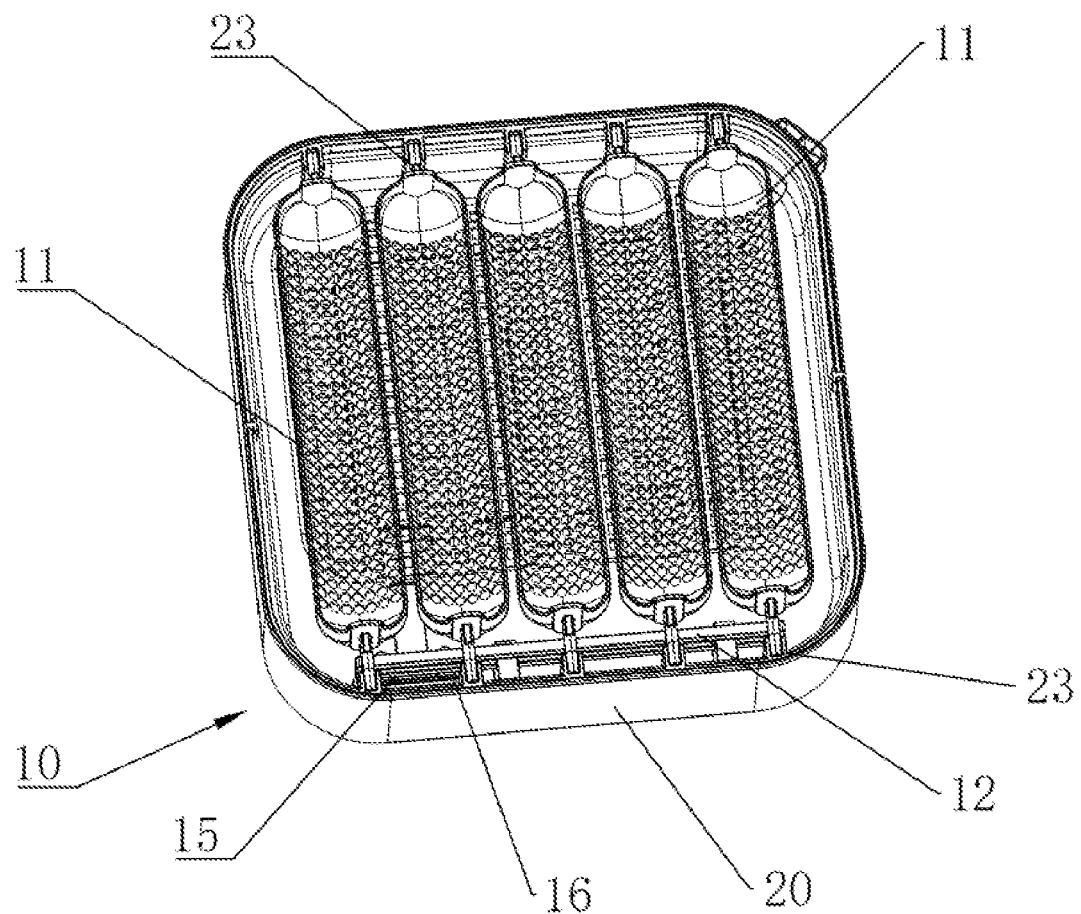
FIG. 1 is a first schematic view showing a three-dimensional structure of an automatic egg turner for an incubator disclosed in an embodiment.
Figure 2:
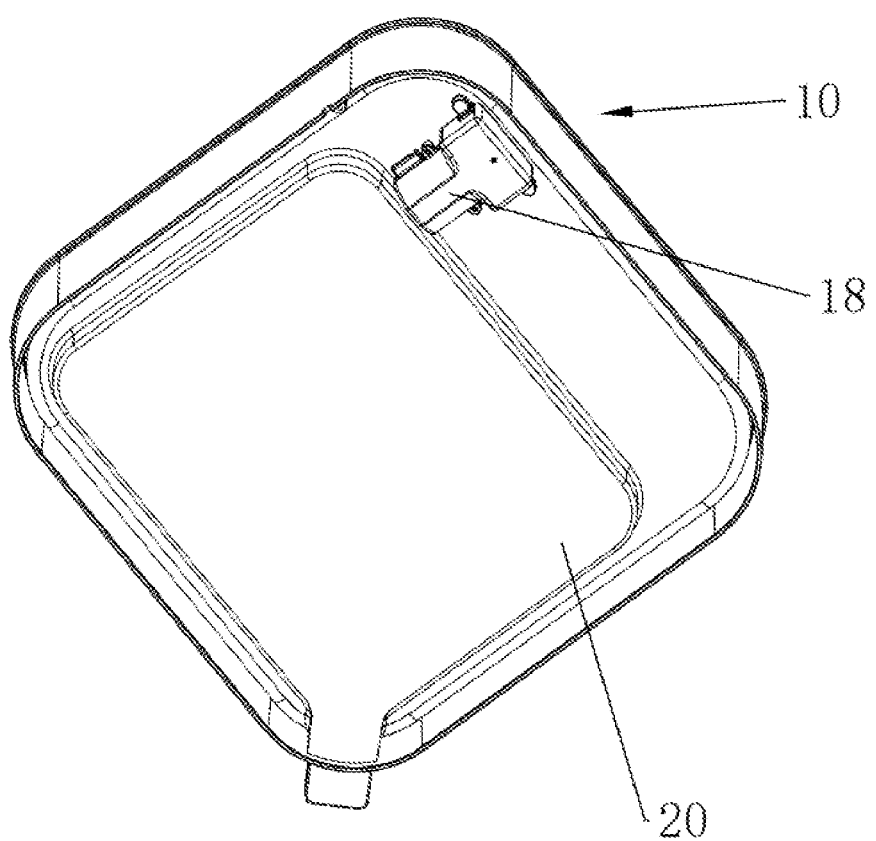
FIG. 2 is a second schematic view showing a three-dimensional structure of an automatic egg turner for an incubator disclosed in an embodiment.

Reference numerals in the accompanying drawings: 10, egg turning assembly; 11, egg trough; 111, first overlapping shaft; 112, second overlapping shaft; 12, connecting plate; 121, insert block; 122, second overlapping groove; 13, egg turning motor; 14, driving gear; 15, driven gear; 151, slot; 16, cover plate; 17, motor fixing plate; 18, motor cover; 20, incubator base; 21, through hole; 22, mounting groove; and 23, first overlapping groove.

DETAILED DESCRIPTION OF THE INVENTION

In order to make objectives, technical solutions and advantages of the present disclosure clearer and more understandable, the present disclosure will be further described in detail below in conjunction with the accompanying drawings and embodiments. It should be noted that the specific embodiments described herein are merely intended to explain the present disclosure, rather than to limit the present disclosure.

In the description of the present disclosure, it should be noted that, unless explicitly specified and defined otherwise, terms "mounted", "connected" and "connection" should be understood in a broad sense, for example, connection may be a fixed connection or a detachable connection, or an integral connection, may be a mechanical connection or an electrical connection, may be a direct connection or an indirect connection via an intermediate medium, may be internal communication of two elements, may be a wireless connection, and may also be a wired connection. For a person of ordinary skill in the art, the specific meanings of the above terms in the present disclosure may be understood according to specific situations.

In the description of the present disclosure, it should be noted that directional or positional relationships indicated by terms such as "center", "upper", "lower", "left", "right", "vertical", "horizontal", "inner" and "outer" are directional or positional relationships based on the accompanying drawings, are merely intended to facilitate describing the present disclosure and simplifying the description, rather than to indicate or imply that the appointed device or element has to be located in a specific direction or structured and operated in the specific direction so as not to be understood as restrictions on the present disclosure. Furthermore, terms such as "first", "second" and "third" are merely for descriptive purposes, and cannot be understood as indicating or implying the relative importance.

Furthermore, the technical features related to the different embodiments of the present disclosure and described below may be combined with each other if only no conflicts are formed therebetween.

An embodiment of the present disclosure discloses an automatic egg turner for an incubator, as shown in FIG. 1 to FIG. 6, including an egg turning assembly 10 mounted on an incubator base 20, the egg turning assembly including egg troughs 11, a connecting plate 12 and an egg turning motor 13, the egg troughs 11 being used for holding several eggs and being respectively overlapped with the incubator base 20 and the connecting plate 12, the connecting plate 12 being movably connected into the incubator base 20, and the egg turning motor 13 being mounted on the bottom of the incubator base 20 and being used for driving the connecting plate 12 to slide left and right in the incubator base 20 so as to drive the egg troughs 11 to swing left and right in the incubator base 20. During specific implementation, a control panel of the egg turning motor 13 is integrated on a control panel of an egg incubator, and the egg turning motor 13 is controlled to rotate forwards or reversely under the control action of the control panel of the egg incubator.

It should be noted that the egg turning motor 13 drives the connecting plate 12 to slide left and right in the incubator base 20 so as to drive the egg troughs 11 to swing left and right in the incubator base 20, and thus, the automatic egg turner for the incubator is provided. As the egg turning motor 13 is mounted on the bottom of the incubator base 20, the egg turning assembly 10 takes up small space in the incubator base 20, heat generated by the motor can be prevented from affecting the incubating rate of the eggs, an egg turner mechanism is simplified, and the production cost is reduced.

Figure 4:
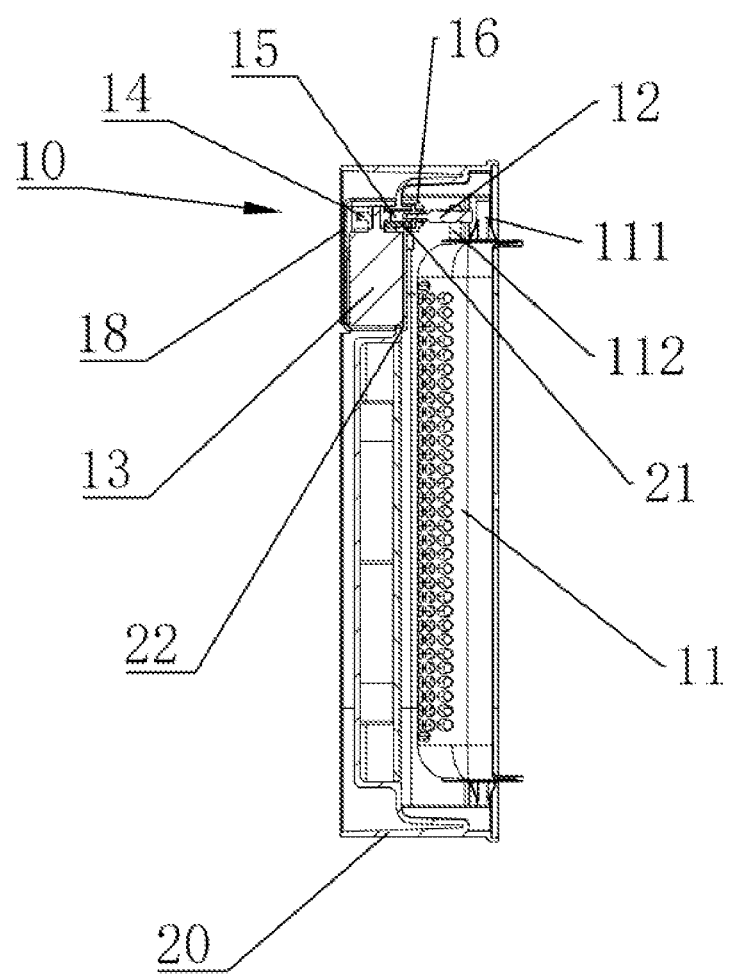
FIG. 4 is a schematic view showing a B-B sectional structure of FIG. 3.
Figure 5:
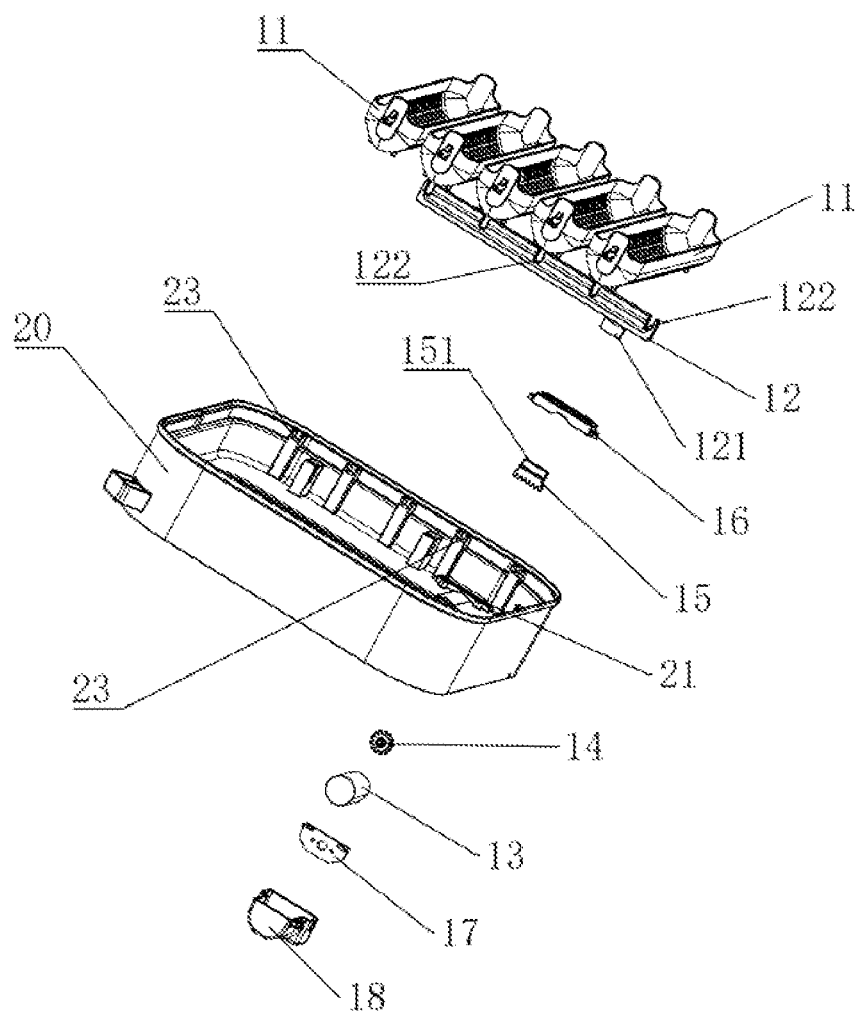
FIG. 5 is a schematic view showing an exploded structure of an automatic egg turner for an incubator disclosed in an embodiment.

As shown in FIG. 4 and FIG. 5, a driving gear 14 is mounted on an output shaft of the egg turning motor 13, the bottom of the connecting plate 12 is connected with a driven gear 15 engaged with the driving gear 14, and the incubator base 20 is provided with a through hole 21 facilitating moving the driven gear 15.

As shown in FIG. 4 and FIG. 5, one end of the connecting plate 12 is provided with an insert block 121, and the driven gear 15 is provided with a slot 151 in inserting fit with the insert block 121. During specific implementation, the insert block 121 and the connecting plate 12 are of an integrally molded structure. By inserting fit between the insert block 121 and the slot 151, the connecting plate 12 is connected to the driven gear 15, which facilitates transferring the motion of the driving gear 14 to the connecting plate 12, thereby driving the egg troughs 11 to swing for achieving automatic egg turning.

It should be noted that the driving gear 14 is driven to rotate under the forward and reverse rotation actions of the egg turning motor 13; the driving gear 14 is engaged with the driven gear 15, so that the driven gear 15 starts to move synchronously; the driven gear 15 is in inserting fit with the connecting plate 12, so that the connecting plate 12 moves left and right in the incubator base 20; and the egg troughs 11 are respectively overlapped with the incubator base 20 and the connecting plate 12, so that the connecting plate 12 drives the egg troughs 11 to swing, which facilitates turning eggs in the egg troughs 11.

Figure 3:
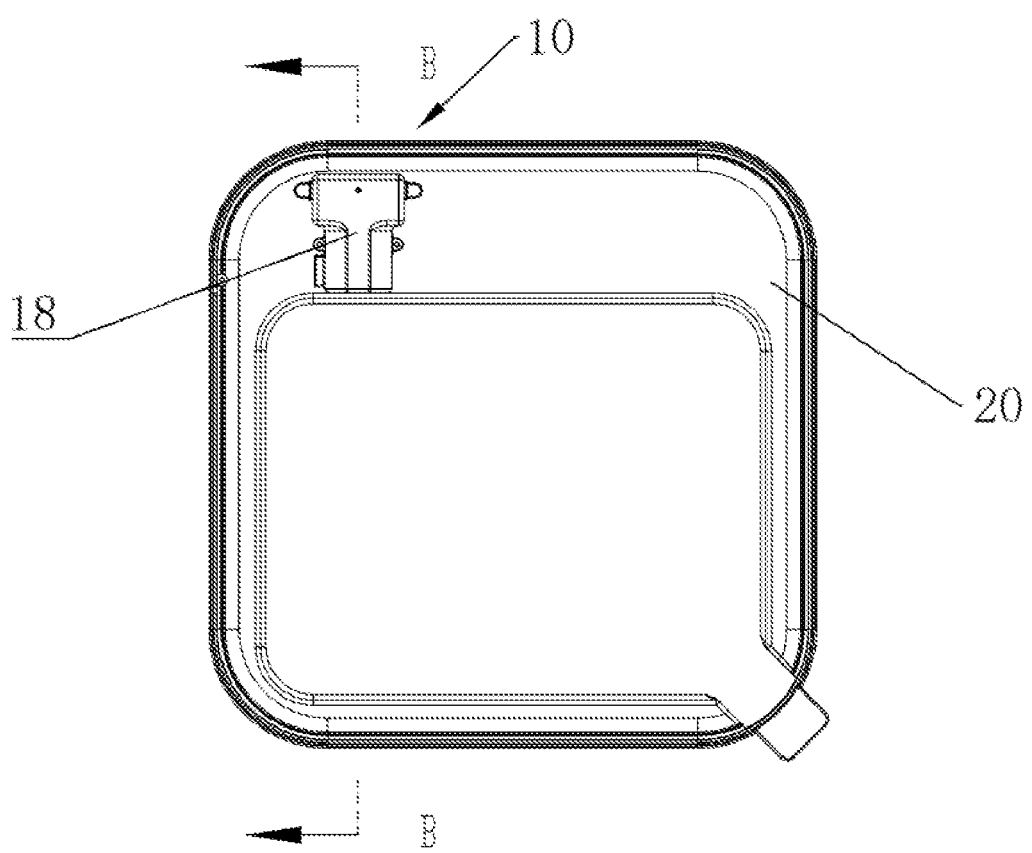
FIG. 3 is a bottom view showing an automatic egg turner for an incubator disclosed in an embodiment.

As shown in FIG. 3 to FIG. 5, the incubator base 20 is internally provided with a cover plate 16 which is detachably connected, and the cover plate 16 is used for limiting the motion stroke of the driven gear 15. It should be noted that the cover plate 16 plays a limiting role, and the driven gear 15 is embedded into the cover plate 16 by which it is convenient to limit the motion stroke of the driven gear 15.

As shown in FIG. 5, the driving gear 14 is a circular gear, and the driven gear 15 is a straight gear. It should be noted that the driving gear 14 is the circular gear, the driven gear 15 is the straight gear, and therefore, it is convenient to convert the rotation motion of the egg turning motor 13 into the linear motion of the connecting plate 12 by the fit between the driving gear 14 and the driven gear 15.

As shown in FIG. 1 to FIG. 6, the egg turning motor 13 is fixedly mounted on the bottom of the incubator base 20 via a motor fixing plate 17.

As shown in FIG. 1 to FIG. 6, the incubator base 20 is provided with a motor cover 18 for covering the egg turning motor 13, and the motor cover 18 is detachably connected to the incubator base 20. It should be noted that the motor cover 18 plays a covering role and facilitates covering the egg turning motor 13, so that the egg turning motor 13 is hiddenly mounted on the bottom of the incubator base 20, and the appearance of the incubator is beautified; moreover, the heat generated by the egg turning motor 13 can be directly discharged to external space, so that the incubation of the eggs in the egg troughs 11 is not affected, and the incubating efficiency of the incubator is increased; in addition, the egg turning assembly 10 and the incubator base 20 share mounting parts, so that the structure of the egg turner is simplified, and the manufacturing cost of the incubator is reduced; furthermore, the egg turner takes up smaller space in the incubator, thereby indirectly reducing the overall volume of the incubator and reducing the production and transportation costs of the incubator.

As shown in FIG. 4, the bottom of the incubator base 20 is provided with a mounting groove 22 facilitating mounting the egg turning motor 13, and the section of the mounting groove 22 is disposed to be arc-shaped. It should be noted that the section of the mounting groove 22 is disposed to be arc-shaped, and therefore, it is convenient to mount the egg turning motor 13 on the bottom of the incubator base 20.

Figure 6:
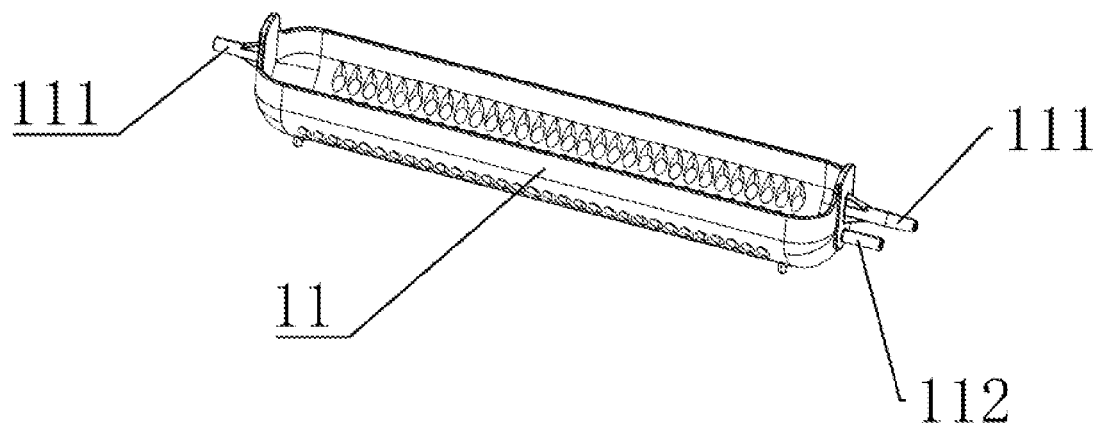
FIG. 6 is a schematic view showing a three-dimensional structure of an egg trough of an automatic egg turner for an incubator disclosed in an embodiment.

As shown in FIG. 1 and FIG. 6, two ends of each of the egg troughs 11 are both provided with first overlapping shafts 111, and the incubator base 20 is internally provided with first overlapping grooves 23 in overlapping fit with the first overlapping shafts 111. During specific implementation, the first overlapping shafts 111 and the egg troughs 11 are of integrally molded structures.

As shown in FIG. 1 to FIG. 6, the connecting plate 12 is provided with at least one second overlapping groove 122, and the egg troughs 11 are provided with second overlapping shafts 112 in overlapping fit with the second overlapping grooves 122. During specific implementation, the second overlapping shafts 112 and the egg troughs 11 are of integrally molded structures, and the second overlapping shafts 112 are located below the first overlapping shafts 111.

A working principle is that: the egg turning motor 13 drives the connecting plate 12 to slide left and right in the incubator base 20 so as to drive the egg troughs 11 to swing left and right in the incubator base 20, and thus, the automatic egg turner for the incubator is provided. As the egg turning motor 13 is mounted on the bottom of the incubator base 20, the egg turning assembly 10 takes up small space in the incubator base 20, heat generated by the motor can be prevented from affecting the incubating rate of the eggs, an egg turner mechanism is simplified, and the production cost is reduced.

Obviously, the above-mentioned embodiments are merely intended to clearly describe the examples, rather than to limit embodiments. Those of ordinary skill in the art can also make other variations or alterations in different forms on the basis of the above-mentioned description. It is unnecessary and impossible to exhaustively list all the embodiments herein. Apparent variations or alterations derived from these still fall within the protection scope of the present disclosure.

The invention claimed is:

1. An automatic egg turner for an incubator, comprising an egg turning assembly (10) mounted on an incubator base (20), the egg turning assembly (10) comprising egg troughs (11), a connecting plate (12) and an egg turning motor (13), the egg troughs (11) being used for holding several eggs and being respectively overlapped with the incubator base (20) and the connecting plate (12), the connecting plate (12) being movably connected into the incubator base (20), and the egg turning motor (13) being mounted on a bottom of the incubator base (20) and being used for driving the connecting plate (12) to slide left and right in the incubator base (20) so as to drive the egg troughs (11) to swing left and right in the incubator base (20);

wherein a driving gear (14) is mounted on an output shaft of the egg turning motor (13), a bottom of the connecting plate (12) is connected with a driven gear (15) engaged with the driving gear (14), and the incubator base (20) is provided with a through hole (21) facilitating moving the driven gear (15), wherein the driving gear (14) is a circular gear, and the driven gear (15) is a straight gear coplanar with the connecting plate (12);

wherein the egg turning motor (13) is fixedly mounted on the bottom of the incubator base (20) via a motor fixing plate (17).

2. The automatic egg turner for the incubator of claim 1, wherein one end of the connecting plate (12) is provided with an insert block (121), and the driven gear (15) is provided with a slot (151) in inserting fit with the insert block (121).

3. The automatic egg turner for the incubator of claim 1, wherein the incubator base (20) is internally provided with a cover plate (16) which is detachably connected, and the cover plate (16) is used for limiting the motion stroke of the driven gear (15).

4. The automatic egg turner for the incubator of claim 1, wherein the incubator base (20) is provided with a motor cover (18) for covering the egg turning motor (13), and the motor cover (18) is detachably connected to the incubator base (20).

5. The automatic egg turner for the incubator of claim 1, wherein the bottom of the incubator base (20) is provided with a mounting groove (22) facilitating mounting the egg turning motor (13), and the section of the mounting groove (22) is disposed to be arc-shaped.

6. The automatic egg turner for the incubator of claim 1, wherein two ends of each of the egg troughs (11) are both provided with first overlapping shafts (111), and the incubator base (20) is internally provided with first overlapping grooves (23) in overlapping fit with the first overlapping shafts (111).

7. The automatic egg turner for the incubator of claim 1, wherein the connecting plate (12) is provided with at least one second overlapping groove (122), and the egg troughs (11) are provided with second overlapping shafts (112) in overlapping fit with the second overlapping grooves (122).

8. The automatic egg turner for the incubator of claim 1, wherein one end of the connecting plate (12) is provided with an insert block (121), and the driven gear (15) is provided with a slot (151) in inserting fit with the insert block (121).

9. The automatic egg turner for the incubator of claim 8, wherein the insert block (121) and the connecting plate (12) are integrally formed by a single piece.

* * * * *